United States Patent
Okawa

(10) Patent No.: US 12,246,705 B2
(45) Date of Patent: Mar. 11, 2025

(54) CONTACT DETERMINATION SYSTEM, CONTACT DETERMINATION DEVICE, CONTACT DETERMINATION METHOD AND PROGRAM

(71) Applicant: DENSO CORPORATION, Kariya (JP)

(72) Inventor: Isao Okawa, Kariya (JP)

(73) Assignee: DENSO CORPORATION, Kariya (JP)

( * ) Notice: Subject to any disclaimer, the term of this patent is extended or adjusted under 35 U.S.C. 154(b) by 304 days.

(21) Appl. No.: 17/814,429

(22) Filed: Jul. 22, 2022

(65) Prior Publication Data

US 2023/0033502 A1  Feb. 2, 2023

(30) Foreign Application Priority Data

Jul. 28, 2021  (JP) .................................. 2021-123369

(51) Int. Cl.
*B60W 30/09* (2012.01)
*B60W 30/095* (2012.01)
*B60W 50/00* (2006.01)

(52) U.S. Cl.
CPC ........ *B60W 30/09* (2013.01); *B60W 30/0956* (2013.01); *B60W 50/0097* (2013.01); *B60W 2400/00* (2013.01); *B60W 2554/20* (2020.02)

(58) Field of Classification Search
CPC ............ B60W 30/09; B60W 30/0956; B60W 50/0097; B60W 2554/20; B60W 2400/00
See application file for complete search history.

(56) References Cited

U.S. PATENT DOCUMENTS

| | | | |
|---|---|---|---|
| 10,235,882 B1* | 3/2019 | Aoude | G08G 1/096725 |
| 10,384,676 B2* | 8/2019 | Watanabe | B60W 30/095 |
| 10,723,351 B1* | 7/2020 | Hakki | B64C 39/00 |
| 10,950,130 B2* | 3/2021 | Aoude | G08G 1/166 |
| 2014/0267415 A1* | 9/2014 | Tang | G06T 11/60 |
| | | | 345/633 |
| 2018/0149138 A1* | 5/2018 | Thiercelin | B64C 39/024 |

FOREIGN PATENT DOCUMENTS

| | | |
|---|---|---|
| JP | 2010-108069 A | 5/2010 |
| JP | 2018-101299 A | 6/2018 |

OTHER PUBLICATIONS

Inkawhich Nathan et al., Can Targeted Adversarial Examples Transfer When the Source and Target Models Have No Label Space Overlap, 2021) IEEE pp. 41-50 (Year: 2021).*

* cited by examiner

*Primary Examiner* — Gertrude Arthur Jeanglaude
(74) *Attorney, Agent, or Firm* — Maschoff Brennan

(57) ABSTRACT

A contact determination system includes a processor, and determines whether a contact event occurs between target objects in a vicinity of a host vehicle. The processor is configured to acquire, regarding each of the target objects including at least one of (i) a road user other than the host vehicle and (ii) a road-installed object, a type and a moving speed of the target object. The processor is also configured to perform an overlap determination regarding whether at least two target models respectively modeling the target objects overlap with each other. The processor is further configured to determine whether or not the contact event occurs for a pair of the target objects that have been determined to have an overlap based on the type and moving speed of the target object.

12 Claims, 7 Drawing Sheets

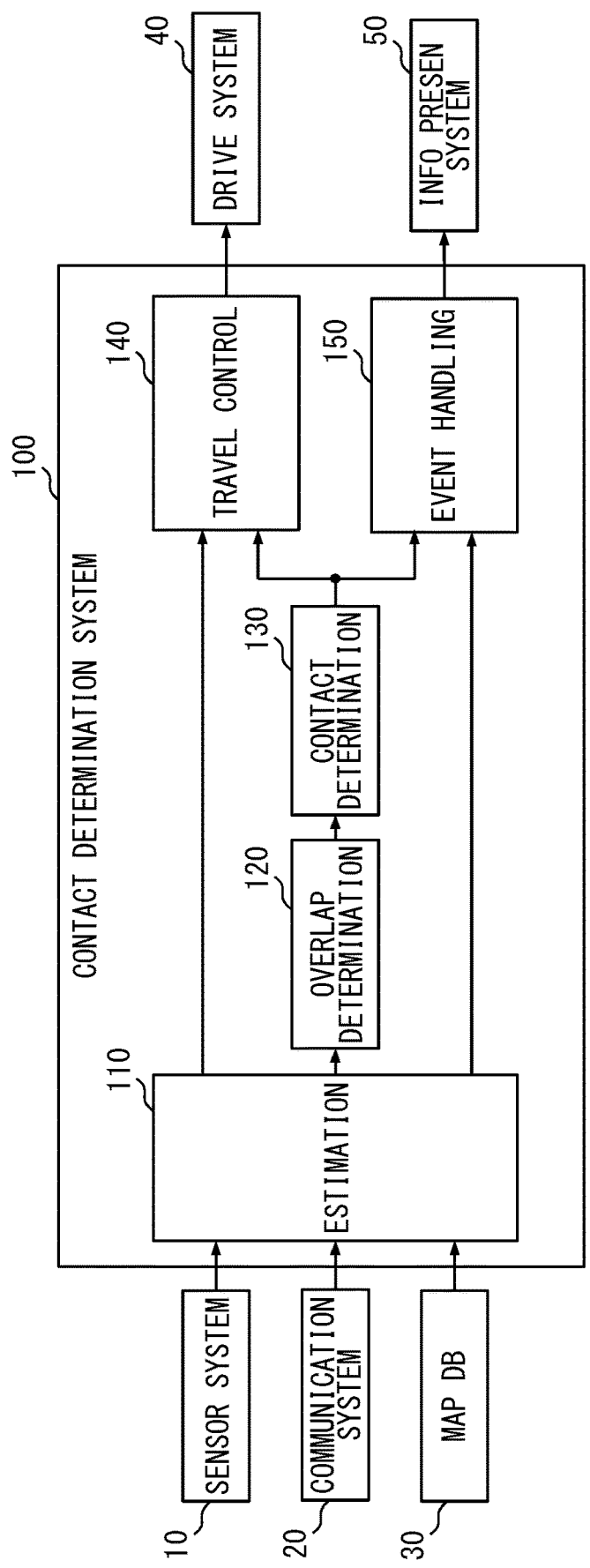

FIG. 5

| | TARGET OBJECT α | | | | | |
|---|---|---|---|---|---|---|
| TARGET OBJECT β | 4 WHL VEHICLE (HI SPD RANGE) | 2 WHL VEHICLE (HI SPD RANGE) | 4 WHL VEHICLE (LO SPD RANGE) | 2 WHL VEHICLE (LO SPD RANGE) | ROAD-INSTALLED OBJECT | PERSONKIND |
| 4 WHL VEHICLE (HI SPD RANGE) | CONTACT | CONTACT | CONTACT | CONTACT | CONTACT | CONTACT |
| 2 WHL VEHICLE (HI SPD RANGE) | CONTACT | CONTACT | CONTACT | CONTACT | CONTACT | CONTACT |
| 4 WHL VEHICLE (LO SPD RANGE) | CONTACT | CONTACT | CONTACT | CONTACT | CONTACT | EXCLUDED |
| 2 WHL VEHICLE (LO SPD RANGE) | CONTACT | CONTACT | CONTACT | EXCLUDED | EXCLUDED | EXCLUDED |
| ROAD-INSTALLED OBJECT | CONTACT | CONTACT | EXCLUDED | EXCLUDED | EXCLUDED | EXCLUDED |
| PEDESTRIAN | CONTACT | CONTACT | EXCLUDED | EXCLUDED | EXCLUDED | EXCLUDED |

FIG. 7

| | TARGET OBJECT α | | | | | |
|---|---|---|---|---|---|---|
| TARGET OBJECT β | 4 WHL VEHICLE (HI SPD RANGE) | 2 WHL VEHICLE (HI SPD RANGE) | 4 WHL VEHICLE (LO SPD RANGE) | 2 WHL VEHICLE (LO SPD RANGE) | ROAD-INSTALLED OBJECT | PEDESTRIAN |
| 4 WHL VEHICLE (HI SPD RANGE) | HI LEVEL NOTICE | HI LEVEL NOTICE | HI LEVEL NOTICE | HI LEVEL NOTICE | HI LEVEL NOTICE | HI LEVEL NOTICE |
| 2 WHL VEHICLE (HI SPD RANGE) | HI LEVEL NOTICE | HI LEVEL NOTICE | HI LEVEL NOTICE | HI LEVEL NOTICE | HI LEVEL NOTICE | HI LEVEL NOTICE |
| 4 WHL VEHICLE (LO SPD RANGE) | HI LEVEL NOTICE | HI LEVEL NOTICE | LO LEVEL NOTICE | LO LEVEL NOTICE | LO LEVEL NOTICE | EXCLUDED |
| 2 WHL VEHICLE (LO SPD RANGE) | HI LEVEL NOTICE | HI LEVEL NOTICE | LO LEVEL NOTICE | LO LEVEL NOTICE | EXCLUDED | EXCLUDED |
| ROAD-INSTALLED OBJECT | HI LEVEL NOTICE | HI LEVEL NOTICE | EXCLUDED | EXCLUDED | EXCLUDED | EXCLUDED |
| PEDESTRIAN | HI LEVEL NOTICE | HI LEVEL NOTICE | EXCLUDED | EXCLUDED | EXCLUDED | EXCLUDED |

CONTACT DETERMINATION SYSTEM, CONTACT DETERMINATION DEVICE, CONTACT DETERMINATION METHOD AND PROGRAM

CROSS REFERENCE TO RELATED APPLICATION

The present application is based on and claims the benefit of priority of Japanese Patent Application No. 2021-123369, filed on Jul. 28, 2021, the disclosure of which is incorporated herein by reference.

TECHNICAL FIELD

The present disclosure generally relates to a contact determination technique for determining the presence or absence of a contact event in which a risk is predicted between target objects in the vicinity of a host vehicle.

BACKGROUND INFORMATION

In a comparative technique for detecting the occurrence of a contact event in which a risk is predicted for a commercial vehicle, the occurrence of a contact event of the vehicle is detected when a reduction rate (that is, negative acceleration) of the number of vehicle speed pulses or when the angular velocity output from the vehicle speed sensor of the commercial vehicle is equal to or higher than the determination reference value.

SUMMARY

It is an object of the present disclosure to provide a contact determination system capable of determining whether or not a contact event occurs, which is performed suitably for a target object subject to such determination.

BRIEF DESCRIPTION OF THE DRAWINGS

Objects, features, and advantages of the present disclosure will become more apparent from the following detailed description made with reference to the accompanying drawings, in which:

FIG. 3 is a block diagram showing a functional configuration of a contact determination system according to the first embodiment;

FIG. 5 is a look-up table for contact determination according to the first embodiment;

FIG. 7 is a look-up table for notification control according to the first embodiment.

DETAILED DESCRIPTION

Figure 1:
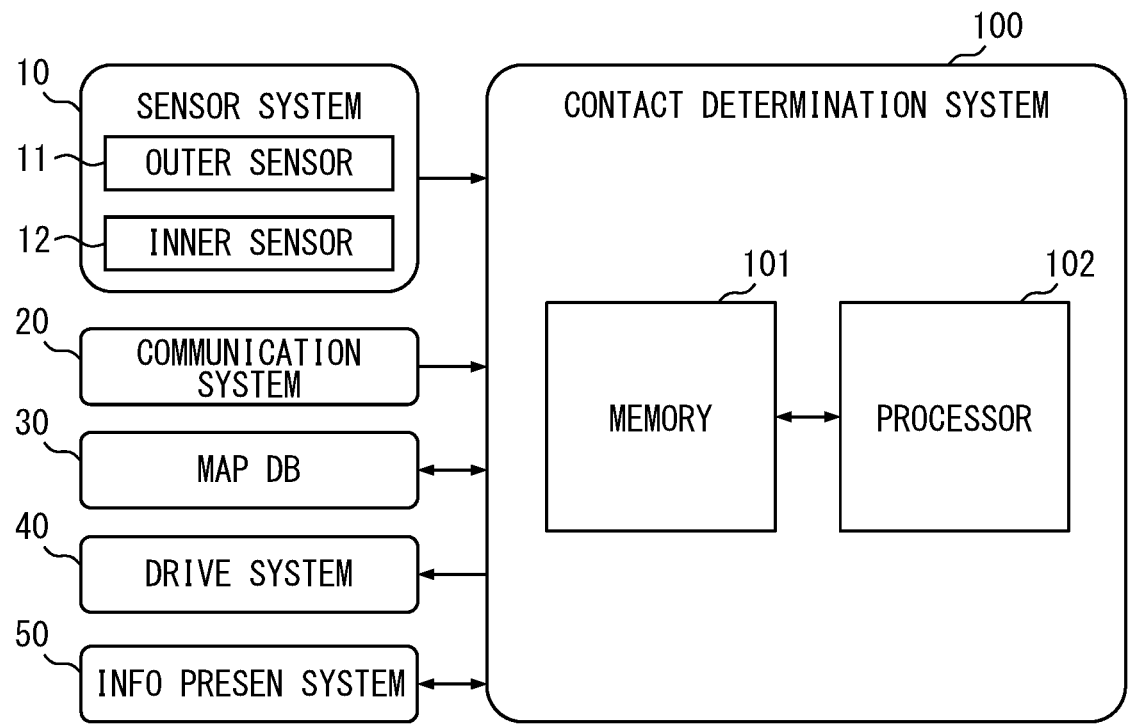
FIG. 1 is a block diagram showing an overall configuration of a first embodiment.

Hereinafter, a plurality of embodiments of the present disclosure will be described with reference to the drawings. It should be noted that the same reference numerals are assigned to corresponding components in the respective embodiments, and redundant descriptions may be omitted. Further, when only a part of a configuration is described in each embodiment, the configuration of the other embodiment described before can be applied to the other parts (i.e., missing parts) of such configuration. Further, not only a combination of the configurations of the embodiments explicitly described, but also a combination of the configurations of a plurality of embodiments not described in the embodiments may be encompassed in the present disclosure unless otherwise specified as hindered.

Hereinafter, one embodiment of the present disclosure will be described with reference to the drawings.

First Embodiment

Figure 2:
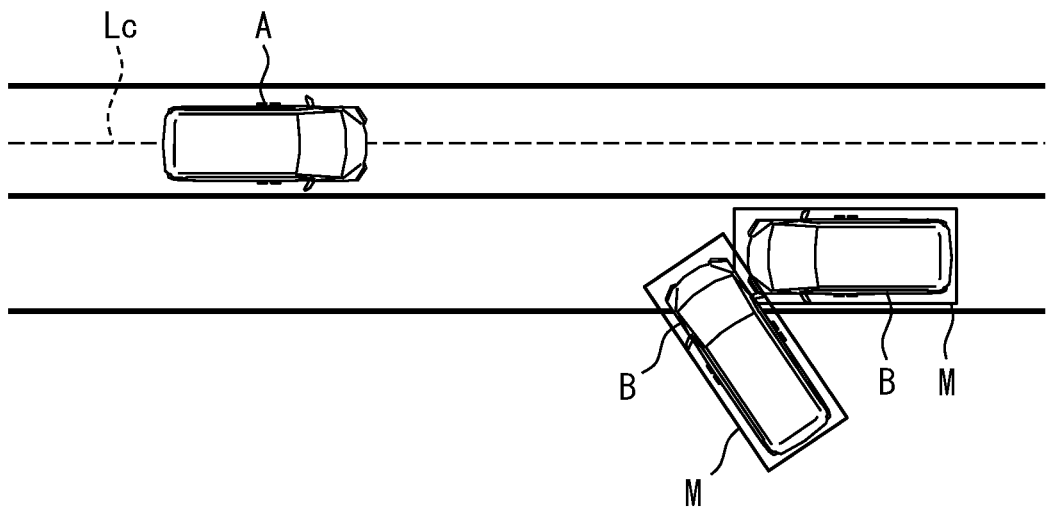
FIG. 2 is a schematic view showing a travel environment of a host vehicle to which the first embodiment is applied.

A contact determination system 100 of the first embodiment shown in FIG. 1 determines whether or not a contact event in which a risk is predicted occurs between or among target objects B in a vicinity of a host vehicle A shown in FIG. 2. From a viewpoint centering on the host vehicle A, it may be understood that the host vehicle A is an own vehicle (or a subject vehicle). Also from the viewpoint centering on the host vehicle A, it may be understood that the target object B is a road user (e.g., using road/roads for a travel of a vehicle). The target object B includes, for example, vehicles (including four-wheeled vehicles and two-wheeled vehicles), road installations (road-installed object), and humans or personkind (e.g., pedestrians). Road installations include, for example, at least one of facility structure such as guardrails, road signs, traffic lights, pedestrian bridges, walls, buildings and private houses. Further, the human here means a person such as a pedestrian or a runner who is not using a vehicle for moving, i.e., not riding on a vehicle for movement or travel on the road.

In the host vehicle A, an automatic driving mode is provided, which is divided into levels according to the degree of manual intervention of the occupant in the driving task. The automatic driving mode may be implemented by autonomous driving control in which the operating system performs all driving tasks, such as conditional driving automation, advanced driving automation, or full driving automation. The automatic driving mode may be realized by advanced driving assistance control in which an occupant performs some or all driving tasks, such as driving assistance or partial driving automation. The automatic driving mode may be realized by combining or switching any one of the autonomous driving control and the advanced driving support control.

The host vehicle A is equipped with a sensor system 10, a communication system 20, a map database (hereinafter, "DB") 30, a drive system 40, and an information presentation system 50 shown in FIG. 3. The sensor system 10 acquires sensor information that can be used by the contact determination system 100 by detecting the outside and the inside of the host vehicle A. Therefore, the sensor system 10 includes an outer sensor 11 and an inner sensor 12.

The outer sensor 11 acquires outside information (i.e., detection information) that can be used by the contact determination system 100 from the outside that is the surrounding environment of the host vehicle A. The outer sensor 11 may acquire the outside information by detecting a target existing in the outside of the host vehicle A. The target detection type outer sensor 11 is, for example, at least one of a camera, a LiDAR (Light Detection and Ranging/ Laser Imaging Detection and Ranging), a radar, a sonar, and the like.

The inner sensor 12 acquires the inner information that can be used by the contact determination system 100 from within the host vehicle A, i.e., from the internal environment of the host vehicle A. The inner sensor 12 may acquire the inner information by detecting a specific kinetic physical quantity within the host vehicle A. The physical quantity detection type inner sensor 12 is at least one of, for example, a travel speed sensor, an acceleration sensor, a gyro sensor, and the like. The inner sensor 12 may acquire the inner information by detecting a specific state of the occupant in the host vehicle A. The occupant detection type inner sensor 12 is at least one of, for example, a driver status monitor (registered trademark), a biological sensor, a seating sensor, an actuator sensor, an in-vehicle device sensor, and the like.

The communication system 20 acquires communication information that can be used by the contact determination system 100 by wireless communication. The communication system 20 may receive a positioning signal from a GNSS (Global Navigation Satellite System) artificial satellite existing outside of the host vehicle A. The positioning type communication system 20 is, for example, a GNSS receiver or the like. The communication system 20 may send and receive communication signals to and from a V2X system existing outside of the host vehicle A. The V2X type communication system 20 is at least one of, for example, a DSRC (Dedicated Short Range Communications) communication device, a cellular V2X (C-V2X) communication device, and the like. The communication system 20 may transmit and receive a communication signal to and from a terminal existing inside of the host vehicle A. The terminal communication type communication system 20 is at least one of, for example, a Bluetooth (registered trademark) device, a Wi-Fi (registered trademark) device, an infrared communication device, and the like.

The map DB 30 stores map information that can be used by the contact determination system 100. The map DB 30 includes a non-transitory, tangible storage medium, among, for example, a semiconductor memory, a magnetic medium, an optical medium and the like. The map DB 30 may be a database of locators that enables estimation of a self-state quantity including a self-position of the host vehicle A. The map DB 30 may be a database of navigation units for navigating a travel route of the host vehicle A. The map DB 30 may be configured by combining plural types of these databases and the like.

The map DB 30 acquires and stores latest map information, for example, by communicating with an external center via a V2X type communication system 20. Here, the map information is converted into two-dimensional or three-dimensional data as information representing a travel environment of the host vehicle A. In particular, as the three-dimensional map data, it may be preferable to adopt digital data of a high-precision map. The map information may include road information representing at least one of, for example, a position, a shape, and a road surface condition of the road itself. The map information may include marking information representing at least one of, for example, the position and shape of a sign and a lane marking drawn on the road. The map information may include structure information representing at least one of, for example, the position and shape of a building and a traffic light facing the road.

The drive system 40 has a configuration which drives/ propels a vehicle body of the host vehicle A based on an instruction from the contact determination system 100. The drive system 40 includes a drive unit that drives the host vehicle A, a brake unit that brakes the host vehicle A, and a steering unit that steers the host vehicle A.

The information presentation system 50 presents notice information directed to the occupant(s) of the host vehicle A.

The information presentation system 50 may present broadcast information by stimulating a visual sense of the occupant. The visual stimulus type information presentation system 50 is at least one of, for example, a HUD (Head-Up Display), an MFD (Multi-Function Display), a combination meter, a navigation unit, a light emitting unit, and the like.

The information presentation system 50 may present broadcast information by stimulating the hearing of the occupant. The auditory stimulus type information presentation system 50 is at least one of, for example, a speaker, a buzzer, a vibration unit, and the like.

The information presentation system 50 may present broadcast information by stimulating skin sensation of the occupant. The skin sensation stimulated by the skin sensation stimulus type information presentation system 50 includes at least one of, for example, a tactile sensation, a temperature sensation, a wind sensation and the like.

The skin sensation stimulus type information presentation system 50 includes at least one of, for example, a steering wheel vibration unit, a driver's seat vibration unit, a steering wheel reaction force unit, an accelerator pedal reaction force unit, a brake pedal reaction force unit, an air conditioning unit, and the like.

The contact determination system 100 is connected, via at least one of a LAN (Local Area Network) line, a wire harness, an internal bus, a wireless communication line, and the like, to the sensor system 10, the communication system 20, the map DB 30, the drive system 40, and the information presentation system 50. The contact determination system 100 includes at least one dedicated computer.

The dedicated computer constituting the contact determination system 100 may be a drive control ECU (Electronic Control Unit) that controls the drive of the host vehicle A. The dedicated computer that constitutes the contact determination system 100 may be a navigation ECU that navigates a travel path of the host vehicle A. The dedicated computer constituting the contact determination system 100 may be a locator ECU that estimates the self-state quantity of the host vehicle A. The dedicated computer constituting the contact determination system 100 may be an actuator ECU that controls a travel actuator of the host vehicle A. The dedicated computer constituting the contact determination system 100 may be an HCU (HMI (Human Machine Interface) Control Unit) that controls information presentation by the information presentation system 50 in the host vehicle A. The dedicated computer that constitutes the contact determination system 100 may be a computer outside of the host vehicle A, which may be communicable via the V2X type communication system 20, such as, for example, the one configuring an external center or a mobile terminal away from the host vehicle A.

The dedicated computer constituting the contact determination system 100 may be an integrated ECU (Electronic Control Unit) that integrates the drive control of the host vehicle A.

The dedicated computer constituting the contact determination system 100 may be a determination ECU that determines a driving task in the drive control of the host vehicle A.

The dedicated computer constituting the contact determination system 100 may be a monitoring ECU that monitors the drive control of the host vehicle A.

The dedicated computer constituting the contact determination system 100 may be an evaluation ECU that evaluates the drive control of the host vehicle A.

The dedicated computer constituting the contact determination system 100 has at least one memory 101 and at least one processor 102.

The memory 101 is a non-transitory, tangible storage medium, i.e., at least one of, for example, a semiconductor memory, a magnetic medium, an optical medium, or the like, which stores a computer-readable program, data, or the like non-temporarily.

The processor 102 includes, as a core, at least one of a CPU (Central Processing Unit), a GPU (Graphics Processing Unit), a RISC (Reduced Instruction Set Computer)-CPU, a DFP (Data Flow Processor), a GSP (Graph Streaming Processor), and the like, for example.

In the contact determination system 100, the processor 102 executes a plurality of instructions included in contact determination programs stored in the memory 101, in order to determine whether or not a contact event occurs, regarding which a risk (of collision) is predicted between the target objects B in the vicinity of the host vehicle A.

As a result, the contact determination system 100 constructs a plurality of functional blocks for determining whether or not a contact event between the target objects B occurs in the vicinity of the host vehicle A.

As shown in FIG. 3, the plurality of functional blocks constructed in the contact determination system 100 include an estimation block 110, an overlap determination block 120, a contact determination block 130, a travel control block 140, and a corresponding processing block 150.

The estimation block 110 estimates target information about the target object B and host information about the host vehicle A. The target information includes, regarding the target object B, a type, a position of the center of gravity, a travel direction, a size, a relative velocity vector, and a ground velocity, for example.

The estimation block 110 may estimate the type of the target object B by inputting the detection information from the outer sensor 11 such as a camera image into a trained neural network.

Further, the estimation block 110 may measure the position of the center of gravity, the travel direction, and the size by modeling the target object B as a target model M.

Specifically, the estimation block 110 may cluster adjacent points in a measured point cloud data of LiDAR, and may model each cluster with a minimum circumscribed rectangle or a minimum circumscribed circle, to obtain the position of the center of gravity, the travel direction, and the size.

When modeled as a rectangle, the size of the target object B is set as the length and width of the rectangle. Also, when modeled as a circle, the size of the target object B is set as the radius of the circle.

The estimation block 110 determines the shape to be modeled according to the type of the target object B. For example, the estimation block 110 may use a rectangular model if the type of the target object B is a vehicle, or may use a circular model if the target object B is a human being. Note that the estimation block 110 may increase the size of the target object B, by adding a margin according to an assumed measurement error.

The estimation block 110 may estimate the relative velocity vector by comparing a current position of the center of gravity with a position of the center of gravity at the time of the previous measurement. The estimation block 110 may estimate the ground speed by converting the relative speed vector into a ground speed vector using a speed and yaw rate of the host vehicle A.

Further, the host information includes an offset amount and a relative angle of the host vehicle A with respect to a traveling lane. The estimation block 110 may estimate the offset amount and the relative angle of the own vehicle based on a lane boundary line detected from the camera image.

The overlap determination block 120 performs an overlap determination, i.e., determines whether at least two target models M for at least two target objects B overlap, based on the target information.

For the overlap determination, the overlap determination block 120 sets a pair of the target objects B as determination targets from among the detected target objects B. The overlap determination block 120 may set all possible pairs of the target objects B as determination targets. Alternatively, the overlap determination block 120 may choose arbitrarily a pair of any target objects B as determination targets. For example, the overlap determination block 120 may set, as a determination target, a pair or pairs settable from among the target objects B existing in a vicinity range of the host vehicle A. The vicinity range may be a certain distance range surrounding the host vehicle A, and its size and shape may be appropriately set.

The overlap determination block 120 predicts a position (e.g., a future position) for each of the pair of target objects B serving as the determination targets, after a predetermined time of travel from the current position (e.g., predicts a movement of each of the target objects B after a certain time from now), and performs overlap determination of the target models M at such position.

The overlap determination block 120 may predict the future position by, for example, linear prediction/extrapolation based on a following equation (1).

In the equation (1), (xp, yp) is a future position of the target object B, (x, y) is a current position, T is a predetermined time (for example, about 1 second), and (vx, vy) is a relative velocity vector.

[Equation 1]

$$\begin{bmatrix} x_p \\ y_p \end{bmatrix} = \begin{bmatrix} x \\ y \end{bmatrix} + T \begin{bmatrix} v_x \\ v_y \end{bmatrix} \qquad (1)$$

The overlap determination block 120 may set the predetermined time to zero. In other words, the overlap determination block 120 may perform overlap determination on the pair of target objects B at a current position instead of the future position.

The overlap determination block 120 calculates a coordinate position (e.g., coordinates of a position) of a representative point or points for each target model M at each future position. When a target model M is rectangular (e.g., has a rectangular shape), the overlap determination block 120 may use four vertices as representative points. When a target model M is circular (e.g., has a circular shape), the overlap determination block 120 may use a position of the center of gravity of the circle, for example, as a representative point.

The overlap determination block 120 performs overlap determination between the target models M for which the representative points have already been calculated.

In case of a pair of rectangular target models M (e.g., overlap determination between two rectangles), the overlap determination block 120 determines that the pair has an overlap when at least one representative point of one rectangle is located inside the other rectangle.

Figure 4C:
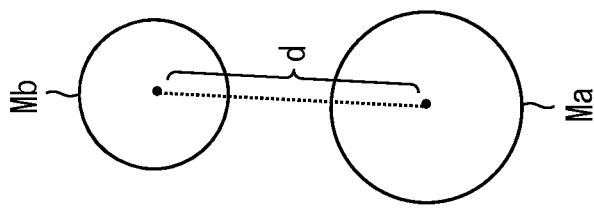
FIGS. 4A to 4C are, respective, a schematic diagram for explaining overlap determination between target models according to the first embodiment.
Figure 4B:
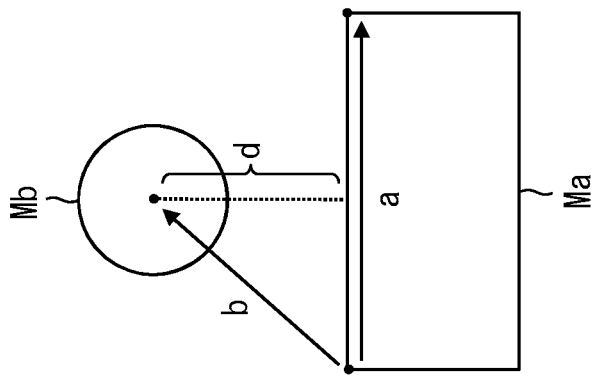

A specific example of the overlap determination will be described in detail with reference to FIGS. 4A to 4C. In the following, one of the two target models M is designated as a model Ma, and the other is designated as a model Mb.

Figure 4A:
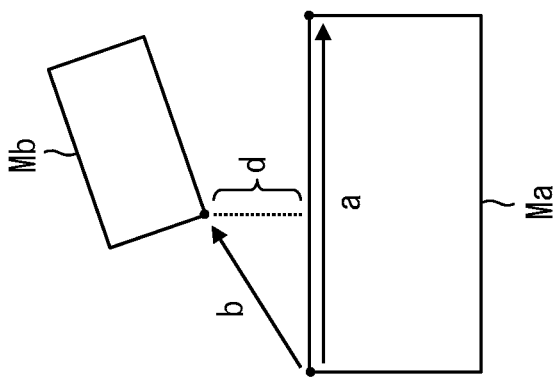

First, an overlap determination regarding a pair of rectangular target models M is described (See FIG. 4A). Here, as shown by the following equation (2), a vector from one representative point (i.e., a specific representative point) in the model Ma to an adjacent representative point (i.e., an adjacent representative point) is defined as bold a (i.e., a), and such a vector is composed of scalar values ax and ay.

Similarly, as shown in the equation (2), another vector from the specific representative point of the model Ma to a representative point in the model Mb is defined as b in bold (i.e., b), and such a vector is composed of scalar values bx and by.

[Equation 2]
$$a = \begin{bmatrix} a_x \\ a_y \end{bmatrix}, b = \begin{bmatrix} b_x \\ b_y \end{bmatrix} \quad (2)$$

In such case, a distance d from the specific representative point of the model Mb to a side (i.e., a representative side) connecting the specific representative point and the adjacent representative point of the model Ma is expressed by the following equation (3).

[Equation 3]
$$d = \frac{a_x b_y - a_y b_x}{\sqrt{a_x^2 + a_y^2}} \quad (3)$$

The distance d has a positive value when the specific representative point of the model Mb is located outside the representative side of the model Ma, and has a negative value when it is located inside the representative side of the model Ma. Therefore, the overlap determination block 120 can determine that there is an overlap therebetween when the distance d is a negative value.

Further, in case of overlap determination between a pair of a rectangular target model Ma and a circular target model Mb (see FIG. 4B), overlap determination can be performed by replacing the above-mentioned model Mb with a circular one. In such case, the specific representative point of the model Mb is a point, i.e., a position of center of gravity of a circle (i.e., a center of the circle). The overlap determination block 120 may determine that there is an overlap when the distance d is smaller than a radius of the model Mb.

In case of overlap determination between a pair of circular target models Ma, Mb (see FIG. 4C), the overlap determination block 120 may determine that there is an overlap when the distance d between the representative points is smaller than the sum of radii of the two target models Ma and Mb.

The contact determination block 130 performs determination (i.e., a contact determination) of whether or not a contact event occurs for the pair of target objects B determined to have an overlap between the target models M. In other words, the contact determination block 130 determines whether a certain pair of the target objects B should either (i) be classified as a pair in which a contact event occurs (i.e., would occur) or (ii) be excluded from a classification that the pair would have a contact event occurring therebetween. The contact determination block 130 performs the contact determination based on type information and moving speed information.

In the contact determination, the contact determination block 130 classifies the target object B into one of a four-wheel vehicle, a two-wheel vehicle, a road-installed object, and personkind (e.g., a pedestrian) based on the type information. The contact determination block 130 further classifies the four-wheel vehicle and the two-wheel vehicle into either a high-speed range or a low-speed range based on the moving speed information.

The contact determination block 130 determines whether or not the target objects B have had a contact with each other based on a classification result of each of the target objects B. For example, the contact determination block 130 performs the determination based on a look-up table shown in FIG. 5.

More specifically, the contact determination block 130 determines that a contact event occurs between vehicles, that is, for a pair of four-wheel vehicles, for a pair of two-wheel vehicles, and for a pair of a four-wheel vehicle and a two-wheel vehicle, regardless of the speed of each vehicle.

Further, the contact determination block 130 determines that a contact event occurs for a pair of (i) a vehicle in a high speed range and (ii) a road-installed object. In addition, the contact determination block 130 determines that a contact event occurs for a pair of (i) a vehicle in a high speed range and (ii) personkind.

Further, the contact determination block 130 determines that a contact event occurs for a pair of (i) a four-wheel vehicle in a low speed range and (ii) a road-installed object. Further, the contact determination block 130 determines that no contact event occurs for a pair of (i) a two-wheel vehicle in a low speed range and (ii) a road-installed object.

In addition, the contact determination block 130 determines that no contact event occurs for a pair of (i) a vehicle in a low speed range and (ii) personkind. Further, the contact determination block 130 determines that no contact event occurs (a) for a pair of road-installed objects, (b) for a pair of (i) a road-installed object and (ii) personkind (e.g., a pedestrian), and (c) for a pair of personkinds (e.g., between pedestrians).

The travel control block 140 performs fallback control for a travel of the host vehicle A when it is determined that a contact event between the target objects B occurs. For example, the travel control block 140 performs fallback control for a retreat of the host vehicle A from a current lane (e.g., from a road with high traffic volume), or performs deceleration control for decelerating the host vehicle A while maintaining the travel in the current lane of the road.

The travel control block 140 selects and performs either fallback control or deceleration control based on the type information and the moving speed information of each of the target objects B determined to have a contact event. For example, the travel control block 140 performs fallback control when (i.e., involving a situation in which) a pair of vehicles has a contact event and at least one of the vehicles has a moving speed in a high speed range. In addition, the travel control block 140 performs fallback control in a situation involving (i) a pair of a vehicle in a high speed range and a road-installed object, or (ii) a pair of a vehicle in a high speed range and personkind (e.g., a pedestrian).

Also, the travel control block 140 performs deceleration control in a situation involving a pair of vehicles in a low speed range. In addition, the travel control block 140 performs deceleration control in a situation involving a pair of a four-wheel vehicle in a low speed range and a road-installed object.

Examples of deceleration control and fallback control are described.

In deceleration control, the travel control block 140 calculates an acceleration a for decelerating a current speed v of the host vehicle A to a target speed v by the following equation (4).

[Equation 4]

$$a = \max(a_{ff}, a_{fb}) \quad (4)$$

Note that aff is a preset reference deceleration (negative value), and afb is a value calculated based on the following equation (5) including a feedback gain kv.

[Equation 5]

$$a_{fb} = -k_v(v - v_r) \quad (5)$$

The travel control block 140 performs deceleration control by controlling the brake unit to realize the acceleration a.

Figure 6:
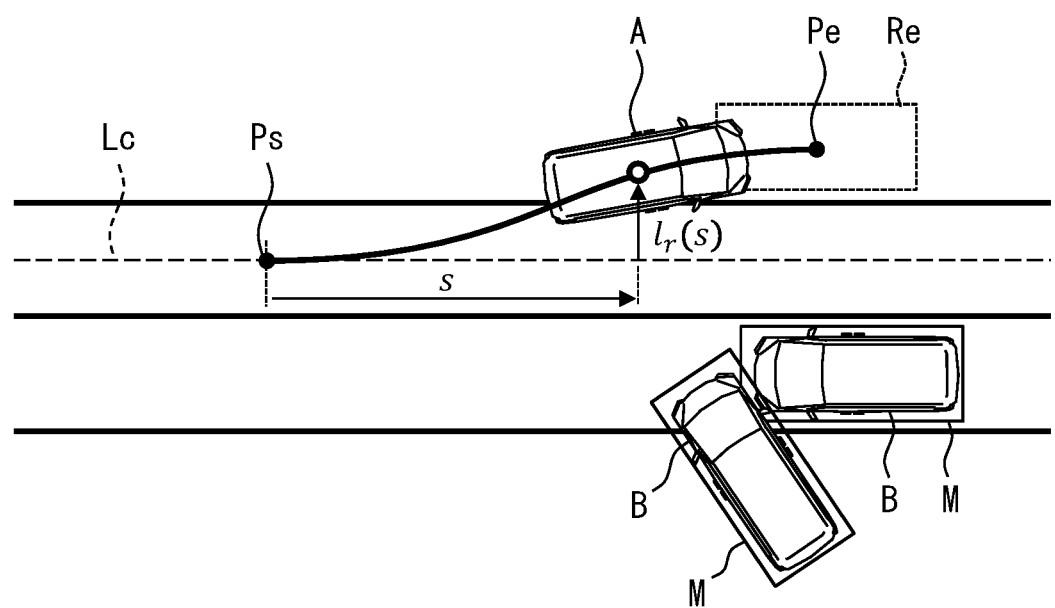
FIG. 6 is a schematic diagram for explaining fallback control according to the first embodiment.

In the fallback control, the travel control block 140 sets a steering angle δ of the host vehicle A based on a model (i.e., a retreat track model) from a start point Ps of the retreat track to an end point Pe in a predetermined retreat area Re (see FIG. 6). The retreat track model is defined by, for example, a lateral offset amount Ir (s) with respect to a lane reference and a relative angle θr (s) with respect to the lane reference as a function of a travel distance s from the start point Ps. The steering angle δ is expressed by the following equation (6) based on a current offset amount I, a current relative angle θ, a feedback gain kl of an offset amount, and a feedback gain kθ of the relative angle.

[Equation 6]

$$\delta = -k_l(l - l_r) - k_\theta(\theta - \theta_r) \quad (6)$$

The travel control block 140 performs the fallback control by controlling the steering unit to realize the steering angle δ. Further, the travel control block 140 decelerates the host vehicle A at the acceleration a based on the equation (5) to stop or drive slowly at the end point Pe of the retreat track.

The event handling block 150 performs response processing for responding to a contact event other than the travel control when it is determined that a contact event occurs. The response processing includes recording processing for recording a contact event, for example. In the recording processing, the event handling block 150 records detection information by the outer sensor 11 such as a camera in a storage medium such as the memory 101.

Further, the response processing includes, for example, a notice process for notifying an occupant of the host vehicle A of an occurrence of a contact event by the information presentation system 50. The event handling block 150 performs either a high-level notice or a low-level notice as the notice process. A high-level notice is a notice with a higher emphasis level than a low-level notice.

For example, a high-level notice may be provided by employing wider variety types of information presentation systems 50 than a low-level notice in terms of the number of types of stimulus provided by the information presentation systems 50.

More specifically, a low-level notice may be provided only by the visual stimulus type information presentation system 50, and a high-level notice may be provided by the visual stimulus type and the auditory stimulus type information presentation systems 50.

Alternatively, a high-level notice may be further provided by the skin sensation stimulus type information presentation system 50.

Alternatively, a high-level notice may give an occupant a stronger stimulus than a low-level notice.

More specifically, a high-level notice may provide, by using the visual stimulus type information presentation system 50, visual stimulus in an intensified manner in terms of at least one of brightness, display size, display time, emphasis color usage ratio, message content emphasis degree, and the like, than those of the low-level notice.

As another specific example, a high-level notice provided by the auditory stimulus type information presentation system 50 may have auditory stimulus in an intensified manner in terms of at least one of sound volume, presentation time, message content emphasis degree, and the like than those of a low-level notice.

The event handling block 150 selects and provides either a high-level notice or a low-level notice based on the type information and the moving speed information of each of the target objects B determined to have a contact event. For example, the event handling block 150 performs selection based on the look-up table shown in FIG. 7. More specifically, the event handling block 150 provides a high-level notice when a contact event involves a pair of vehicles and the moving speed of at least one of the pair of vehicles is in a high speed range. In addition, the event handling block 150 provides a high-level notice when a contact event involves a pair of a high-speed range vehicle and a road-installed object, or a pair of a high-speed range vehicle and person-kind (e.g., a pedestrian).

Further, the event handling block 150 provides a low-level notice when a contact event involves a pair of vehicles in a low speed range. In addition, the event handling block 150 provides a low-level notice when a contact event involves a pair of a four-wheel vehicle in a low speed range and a road installed object.

Figure 8:
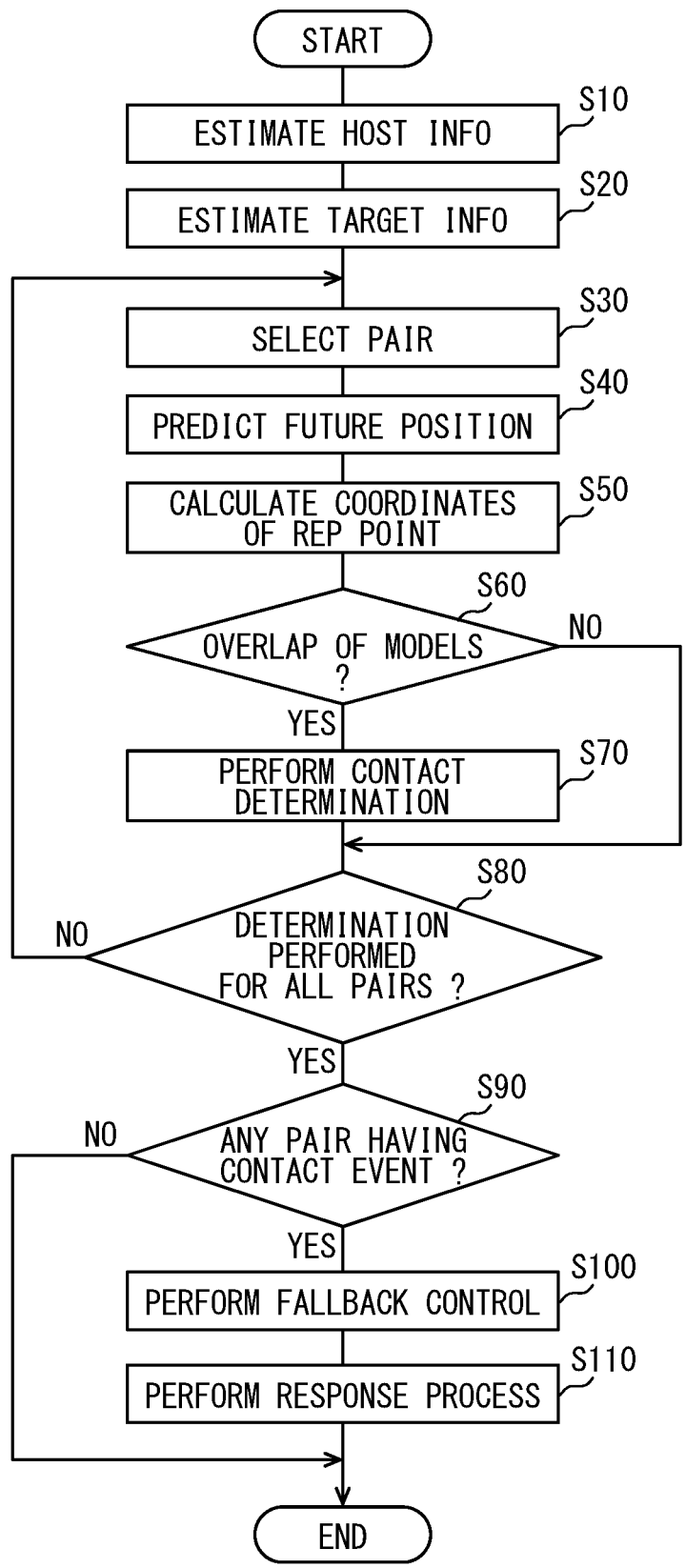
FIG. 8 is a flowchart showing a contact determination method according to the first embodiment.

A flow of a contact determination method with which the contact determination system 100 determines whether or not a contact event between target objects B occurs in the vicinity of the host vehicle A by jointly using the blocks 110, 120, 130, 140, and 150 described so far (hereinafter, a contact determination flow) is described below with reference to FIG. 8.

The processing flow is repeatedly performed during an activation of the host vehicle A. "S" plus two or three digits serves as a step numbering in the processing flow, indicating each of a plurality of steps performed or realized by a plurality of instructions included in a contact determination program.

First, in S10, the estimation block 110 estimates the host information. In S20, the estimation block 110 estimates the target information. Next, in S30, the overlap determination block 120 selects a pair of target objects B as determination targets. Subsequently, in S40, the overlap determination block 120 predicts a future position of each of the selected target objects B. Further, in S50, the overlap determination block 120 calculates coordinates of the representative points in the target models M at the future position.

Subsequently, in S60, the overlap determination block 120 determines whether or not the target models M overlap with each other. When it is determined, in S60, that there is an overlap, then in S70, the contact determination block 130 performs a contact determination based on the type information and the moving speed information for the pair. After the processing of S70, the flow shifts to S80. On the other hand, if it is determined in S60 that there is no overlap, the processing in S70 is skipped and the flow shifts to S80.

In S80, the overlap determination block 120 determines whether or not a series of processing from S30 to S70 has been perform for all the pairs of the determination targets. When it is determined that the processing has not been perform for all the pairs, the flow returns to S30. On the other hand, when it is determined that the processing has been perform for all the pairs, the flow shifts to S90.

In S90, the contact determination block 130 determines whether or not there is a pair of target objects B in which a contact event occurs. If there is no pair in which a contact event occurs, the flow ends after such determination. On the other hand, if there is any pair in which a contact event occurs, the flow shifts to S100. In S100, the travel control block 140 performs fallback control of the host vehicle A. Then, in S110, the event handling block 150 performs the response processing according to the contact determination result. Specifically, in S110, the recording process and the notice process about the contact event are performed. Regarding the notice process, either a high-level notice or a low-level notice is perform based on the type information and the moving speed information of the pair in which a contact event occurs.

According to the above-described first embodiment, the presence or absence of an overlap is determined for at least two of the target models M that respectively model the target objects B, and, regarding a pair of the target objects B determined to have an overlap, it is then determined whether or not a contact event occurs based on the type and the moving speed. Therefore, whether or not a contact event occurs in a pair of target objects B is determinable, by taking characteristics of the behavior caused by the type and moving speed of each of the target objects B into consideration. Therefore, it may be possible to suitably determine whether or not a contact event occurs, for the target objects B of the determination. Further, according to the first embodiment, whether or not a contact event occurs may be determinable for the target objects B, without using information about the target objects B via V2X communication.

Further, according to the first embodiment, determining whether or not a contact event occurs includes determining that a contact event occurs for a pair of vehicles regardless of the moving speed. Therefore, it may be possible to determine that a contact event occurs for a pair of vehicles, regarding which a risk of a contact event is predicted reliably and proactively, for preventing a serious damage, casualty and the like from the contact event.

In addition, according to the first embodiment, determining whether or not a contact event occurs means determining that no contact event occurs for a pair of (i) personkind and (ii) a vehicle which has a moving speed in a low speed range, i.e., in terms of determination of a contact event involving a vehicle which may have the moving speed either in a high speed range or in a low speed range. Therefore, it is possible to avoid unnecessarily determining that a contact event with risk occurs for a pair of (i) personkind who is getting off from the vehicle or who is getting on the vehicle and (ii) the vehicle. Therefore, an accurate contact determination is performable.

Further, according to the first embodiment, determining whether or not a contact event occurs includes determining that a contact event occurs for a pair of (i) a four-wheel vehicle having a moving speed in a low speed range and (ii) a road-installed object. Then, determining whether or not a contact event occurs includes determining that no contact event occurs for a pair of (i) a two-wheel vehicle having a moving speed in a low speed range and (ii) a road-installed object. Therefore, it is possible to avoid unnecessarily determining that a contact event occurs for a pair of (i) a two-wheel vehicle leaning against a road-installed object and the road-installed object itself, i.e., an unnecessary, risk/damage prediction is avoidable. Therefore, an accurate contact determination is performable.

Further, according to the first embodiment, determining whether or not a contact event occurs includes determining that no contact event occurs for a pair of personkinds. Therefore, it is possible to avoid unnecessarily determining that a contact event occurs for a pair of personkinds, by predicting a risk/damage for such a pair which poses low or no risk even if they come into contact with each other.

In addition, according to the first embodiment, determining whether or not a contact event occurs includes determining that no contact event occurs for a pair of (i) personkind and (ii) a road-installed object. Therefore, it is possible to avoid unnecessarily determining that a contact event occurs for a pair of (i) personkind and (ii) a road-installed object for which a need for responding to the contact event is relatively low.

Further, according to the first embodiment, when it is determined that a contact event occurs, the fallback control of the host vehicle A is further performed. Therefore, the travel of the host vehicle A is appropriately controllable in response to an occurrence of a contact event.

Further, according to the first embodiment, when it is determined that a contact event occurs, a related/relevant notice related to the occurrence of the contact event is provided to an occupant or occupants of the host vehicle A. Therefore, the occurrence of the contact event can be reliably noticed to the occupant(s) of the host vehicle A.

Second Embodiment

The second embodiment according to the present disclosure is a modification of the first embodiment. In the second embodiment, the contact determination block 130 may further classify the target object B, i.e., a two-wheel vehicle into two sub-classifications as (i) a two-wheel vehicle having a drive power source and (ii) a two-wheel vehicle not having a drive power source. A two-wheel vehicle having a drive power source is, for example, a motorcycle and a motorized bicycle. A two-wheel vehicle not having a drive power source is, for example, a bicycle.

In the present embodiment, the contact determination block 130 determines that a contact event occurs for a pair of (i) a two-wheel vehicle having a drive power source and (ii) a road-installed object in a low-speed range, from among pairs of the two-wheel vehicle and the road-installed object. On the other hand, the contact determination block 130 determines that no contact event occurs for a pair of (i) a motorcycle not having a drive power source and (ii) a road-installed object, from among pairs of the two-wheel vehicle in a low speed range and the road-installed object.

According to the second embodiment described above, regarding a pair of a two-wheel vehicle in a low-speed range and a road-installed object, for which a risk of damage or the like is predictable from a contact event, it is possible to make a more accurate determination as to whether or not a contact event occurs, according to whether or not the two-wheel vehicle has a drive power source installed therein.

OTHER EMBODIMENTS

Although multiple embodiments have been described above, the present disclosure is not construed as being limited to those embodiments, and can be applied to various embodiments and combinations within a scope that does not depart from the spirit of the present disclosure.

In a modified example, a dedicated computer constituting the contact determination system 100 may have at least one of a digital circuit and an analog circuit as a processor. Here, the digital circuit is, for example, at least one of ASIC (Application Specific Integrated Circuit), FPGA (Field Programmable Gate Array), SOC (System on a Chip), PGA (Programmable Gate Array), CPLD (Complex Programmable Logic Device) and the like. Further, such a digital circuit may have a memory for storing a program.

In addition to the above-described embodiments, the contact determination system 100 according to the above-described embodiments and the modified example may be implemented as a contact determination device that is a processing device (for example, a processing ECU or the like) mounted on the host vehicle A. Further, the above-described embodiments and the modified example may be implemented as a semiconductor device (for example, a semiconductor chip or the like) including at least one processor 102 and at least one memory 101 of the contact determination system 100.

What is claimed is:

1. A contact determination system comprising a processor and determining whether a contact event, in which a risk of contact is predicted, occurs between target objects in a vicinity of a host vehicle, the target objects including at least one of (i) a road user other than the host vehicle and (ii) a road-installed object, wherein
the processor is configured to:
acquire, regarding each of the target objects, a type of the respective target object and a moving speed of the respective target object if moving;
model each of the target objects as a target model based on the type of the respective target object and the moving speed of the respective target object;
determine that the target models overlap with each other; and
determine that the contact event occurs between the target objects in response to determining that the target models overlap with each other.

2. The contact determination system of claim 1, wherein the road user includes, as a type thereof, at least one of a vehicle and personkind who is not using the vehicle for moving.

3. The contact determination system of claim 2, wherein determining whether the contact event occurs includes determining that the contact event occurs for a pair of vehicles, regardless of the moving speed of the vehicles.

4. The contact determination system of claim 2, wherein determining whether the contact event occurs includes determining that no contact event occurs for a pair including: (i) the vehicle having the moving speed in, from among a high speed range or a low speed range, the low speed range and (ii) the personkind.

5. The contact determination system of claim 2, wherein determining whether the contact event occurs includes:
(A) determining that the contact event occurs for a pair of:
(i) a four-wheel vehicle among the vehicles having the moving speed in, from among a high speed range or a low speed range, the low speed range and (ii) the road-installed object, and (B) determining that no contact event occurs for a pair of:
(i) a two-wheel vehicle among the vehicles having the moving speed in the low speed range and (ii) the road-installed object.

6. The contact determination system of claim 2, wherein determining whether the contact event occurs includes determining that no contact event occurs for a pair of personkinds.

7. The contact determination system of claim 2, wherein determining whether the contact event occurs includes determining that no contact event occurs for a pair of (i) the personkind and (ii) the road-installed object.

8. The contact determination system of claim 1, wherein a fallback control of the host vehicle is performed upon determining that the contact event occurs.

9. The contact determination system of claim 1, wherein a notice related to an occurrence of the contact event is provided for an occupant of the host vehicle upon determining that the contact event occurs.

10. A contact determination device comprising:
a non-transitory computer-readable storage medium storing instructions; and
at least one processor configured to execute the stored instructions,
wherein the contact determination device is configured to perform a contact determination process to determine whether a contact event is predicted between target objects, the target objects including at least one of (i) a road user other than a host vehicle and (ii) a road-installed object, and
wherein the contact determination process includes:
acquiring, regarding each of the target objects, a type of the respective target object and a moving speed of the respective target object if moving;
modeling each of the target objects as a target model based on the type of the respective target object and the moving speed of the respective target object;
determining that the target models overlap with each other; and
determining that the contact event occurs between the target objects in response to determining that the target models overlap with each other.

11. A contact determination method performed by a processor for determining whether a contact event, in which a risk of contact is predicted occurs between target objects in a vicinity of a host vehicle, the target objects including at least one of (i) a road user other than the host vehicle and (ii) a road-installed object, the contact determination method comprising steps of:
acquiring, regarding each of the target objects, a type of the respective target object and a moving speed of the respective target object if moving;
modeling each of the target objects as a target model based on the type of the respective target object and the moving speed of the respective target object;
determining that the target models overlap with each other; and
determining that the contact event occurs between the target objects in response to determining that the target models overlap with each other.

12. A non-transitory, tangible storage medium storing instructions for controlling a computer to serve as a contact determination device or for implementing a contact determination method, the instructions to be executed by a processor for determining whether a contact event, in which a risk of contact is predicted, occurs between target objects in a vicinity of a host vehicle, the target objects including at least one of (i) a road user other than the host vehicle and (ii) a road-installed object, the instructions comprising steps of:

acquiring, regarding each of the target objects, a type of the respective target object and a moving speed of the respective target object if moving;

modeling each of the target objects as a target model based on the type of the respective target object and the moving speed of the respective target object;

determining that the target models overlap with each other; and determining that the contact event occurs between the target objects in response to determining that the target models overlap with each other.

* * * * *